US012431010B2

(12) United States Patent
Shin

(10) Patent No.: US 12,431,010 B2
(45) Date of Patent: Sep. 30, 2025

(54) SYSTEM FOR CONTROLLING FLOOR-TYPE PEDESTRIAN SIGNALS

(71) Applicant: AMOSENSE CO., LTD., Cheonan-si (KR)

(72) Inventor: Gyuweon Shin, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 89 days.

(21) Appl. No.: 18/568,789

(22) PCT Filed: May 30, 2022

(86) PCT No.: PCT/KR2022/007623
§ 371 (c)(1),
(2) Date: Dec. 8, 2023

(87) PCT Pub. No.: WO2022/260326
PCT Pub. Date: Dec. 15, 2022

(65) Prior Publication Data

US 2024/0112567 A1 Apr. 4, 2024

(30) Foreign Application Priority Data

Jun. 8, 2021 (KR) ........................ 10-2021-0074004

(51) Int. Cl.
*G08G 1/005* (2006.01)
*H05B 47/17* (2020.01)
*H05B 47/175* (2020.01)

(52) U.S. Cl.
CPC ............ *G08G 1/005* (2013.01); *H05B 47/17* (2020.01); *H05B 47/175* (2020.01)

(58) Field of Classification Search
CPC ........ G08G 1/005; G08G 1/07; H05B 47/175; H05B 47/17
See application file for complete search history.

(56) References Cited

U.S. PATENT DOCUMENTS

2022/0108614 A1* 4/2022 Mori ...................... G08G 1/005
2023/0386321 A1* 11/2023 Sakurada ............... G08G 1/005

FOREIGN PATENT DOCUMENTS

KR 10-0679852 B1 2/2007
KR 10-2017-0060440 A 6/2017
(Continued)

OTHER PUBLICATIONS

KR Office Action dated Jul. 13, 2021 as received in Application No. 10-2021-0074004.
(Continued)

*Primary Examiner* — Sisay Yacob
(74) *Attorney, Agent, or Firm* — Maschoff Brennan

(57) ABSTRACT

The present invention provides a plurality of floor-type pedestrian signals, in which a control signal and voltage control power are applied, the voltage control power is converted into constant current power in each floor-type pedestrian signal, and the constant current power is applied to an LED array according to the control signal. Through this, the present invention prevents the brightness of the floor-type pedestrian signal from lowering as the distance from a controller increases, and maintains a constant lighting time of the plurality of floor-type pedestrian signals, so that even if the width of a crosswalk increases, the visibility of the floor-type pedestrian signal is kept constant.

9 Claims, 15 Drawing Sheets

(56) References Cited

FOREIGN PATENT DOCUMENTS

| | | | |
|---|---|---|---|
| KR | 10-1968879 | B1 | 7/2019 |
| KR | 10-2108789 | B1 | 5/2020 |
| KR | 10-2137236 | B1 | 7/2020 |
| KR | 10-2335547 | B1 | 12/2021 |

OTHER PUBLICATIONS

KR Decision to Grant Dated Sep. 8, 2021 as received in Application No. 10-2021-0074004.

* cited by examiner

[FIG. 1]
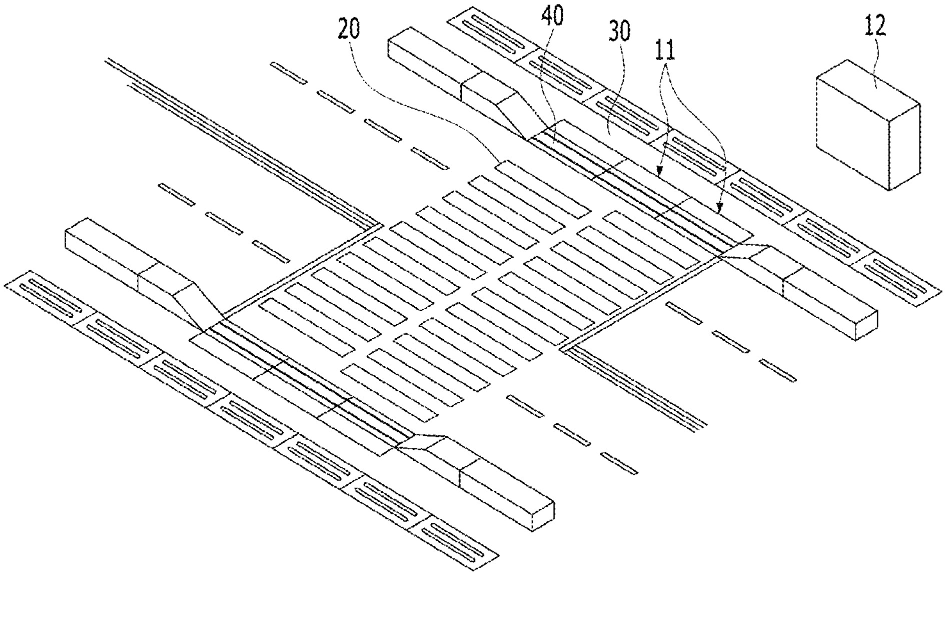

[FIG. 2]
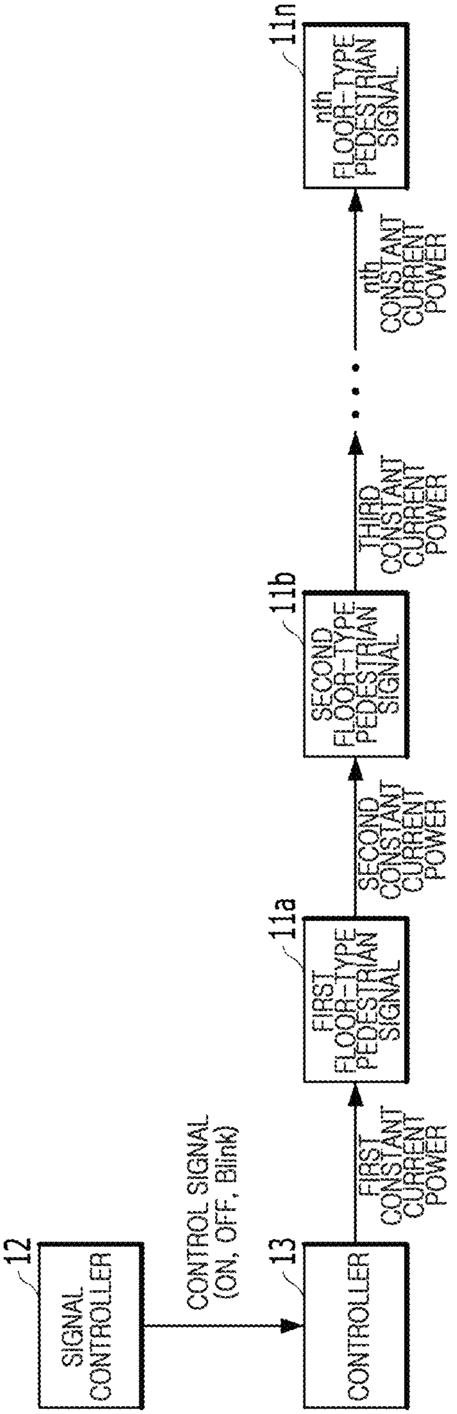

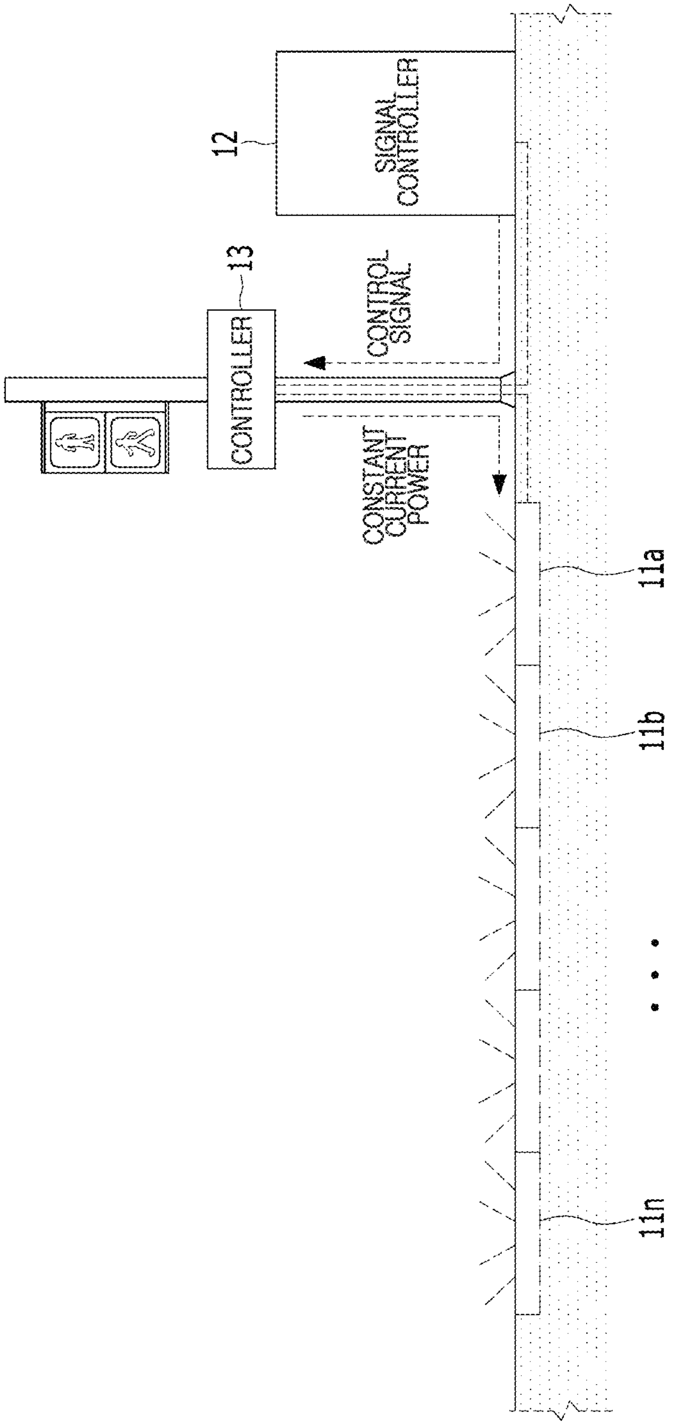
[FIG. 3]

[FIG. 4]
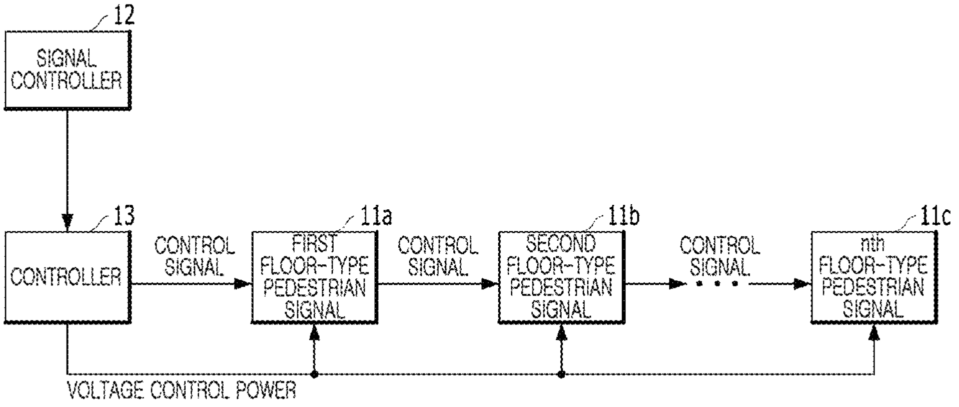

[FIG. 5]
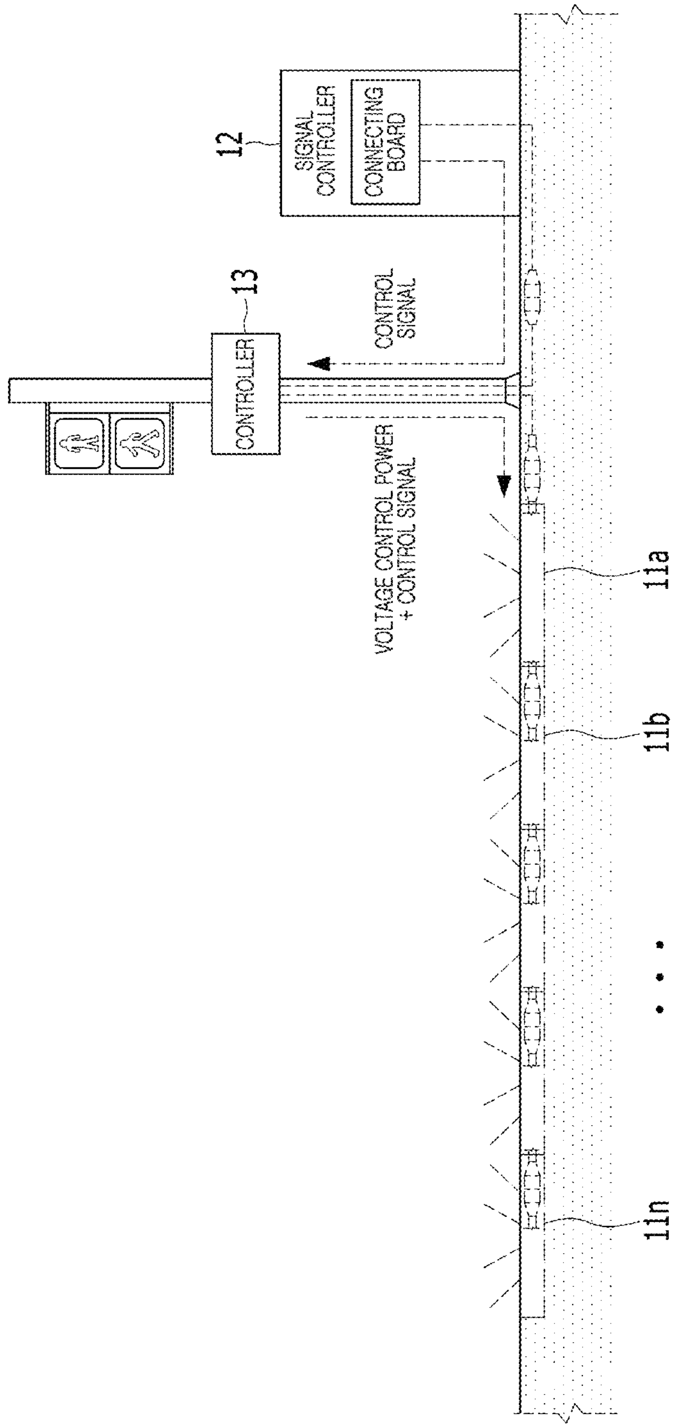

[FIG. 6]
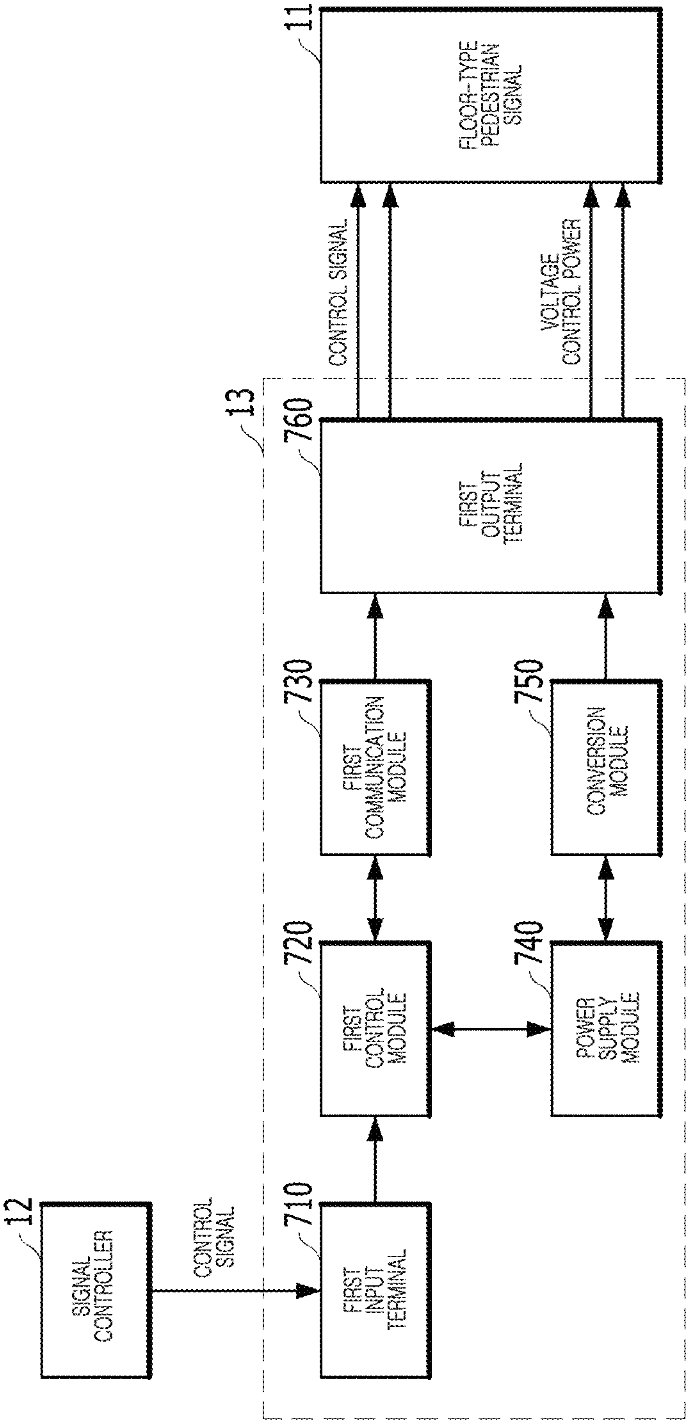

[FIG. 7]
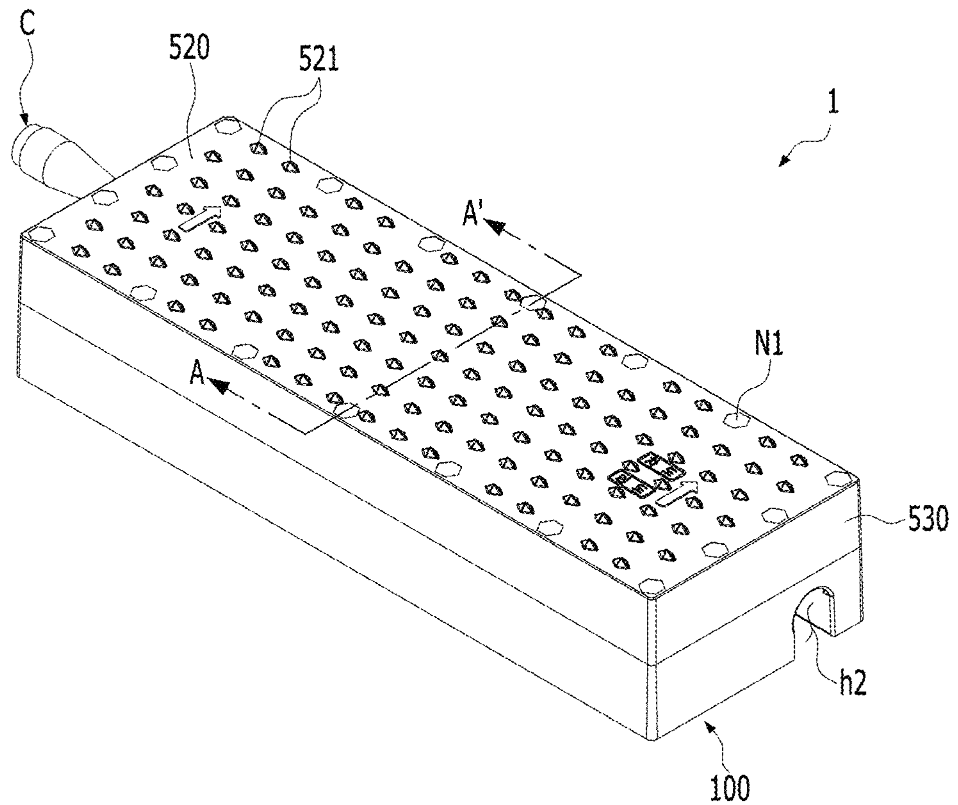

[FIG. 8]
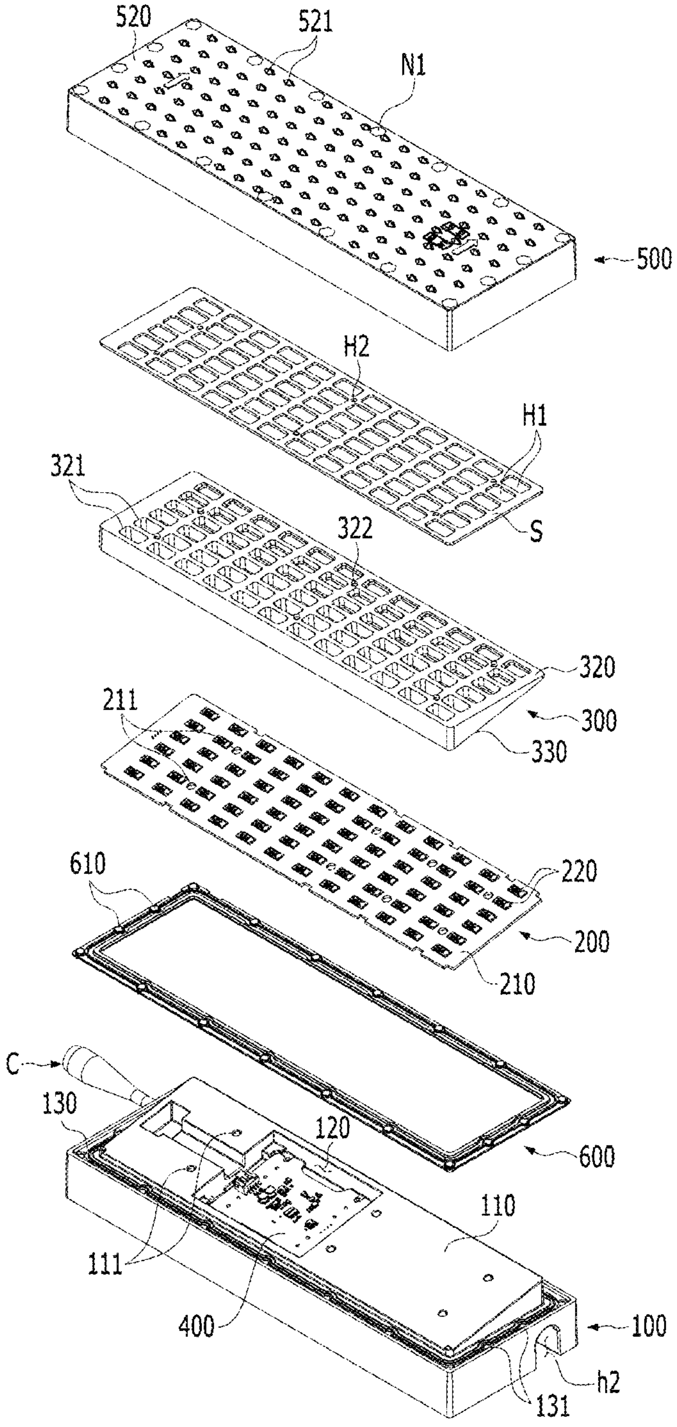

[FIG. 9]
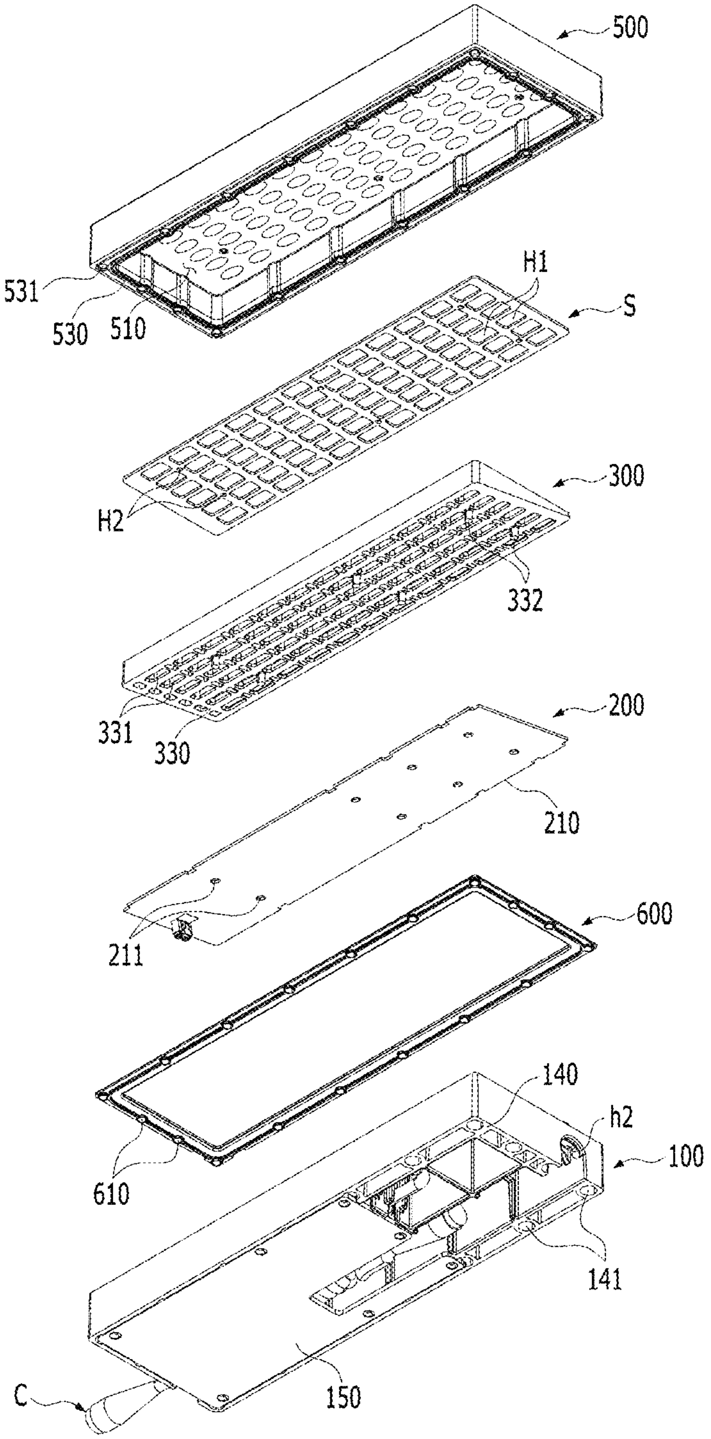

[FIG. 10]
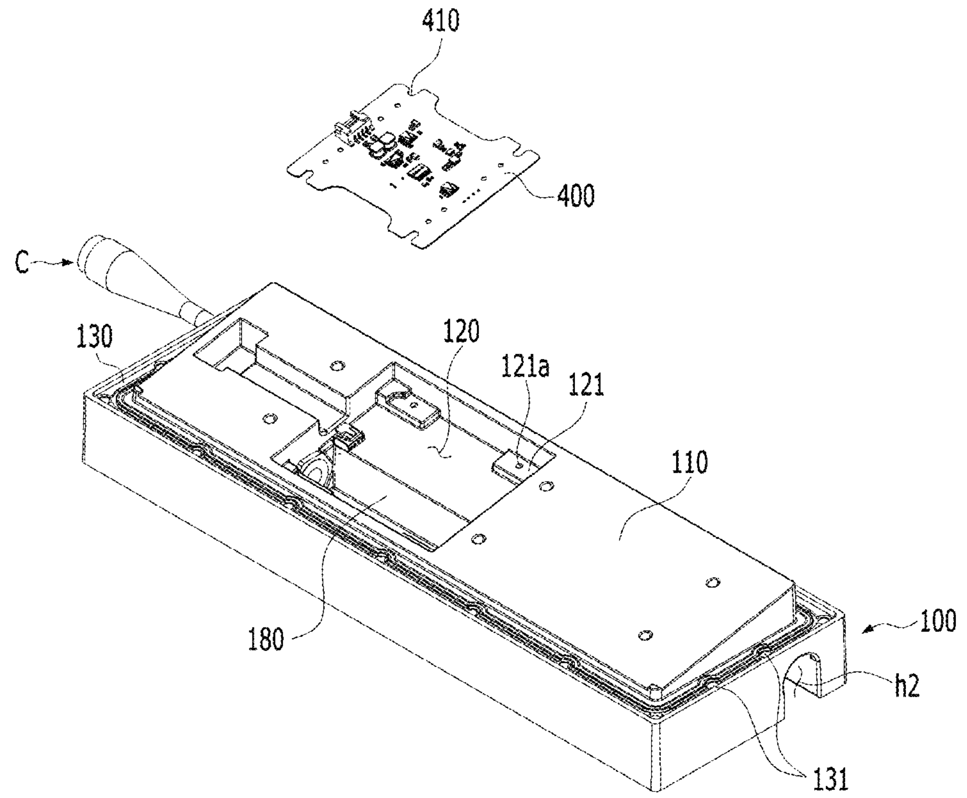

[FIG. 11]
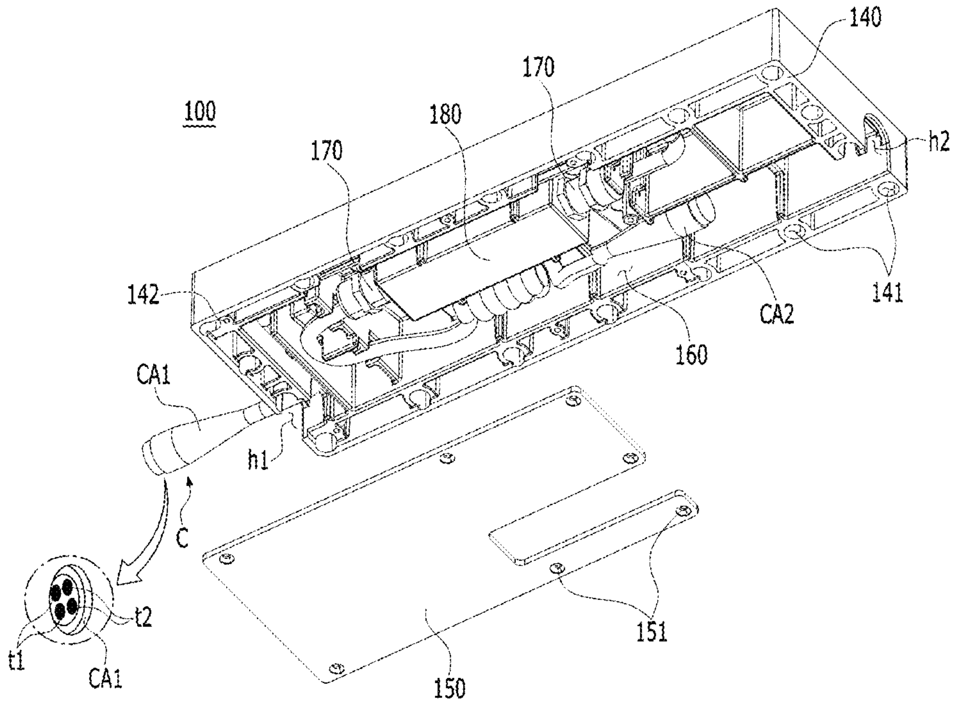
[FIG. 12]
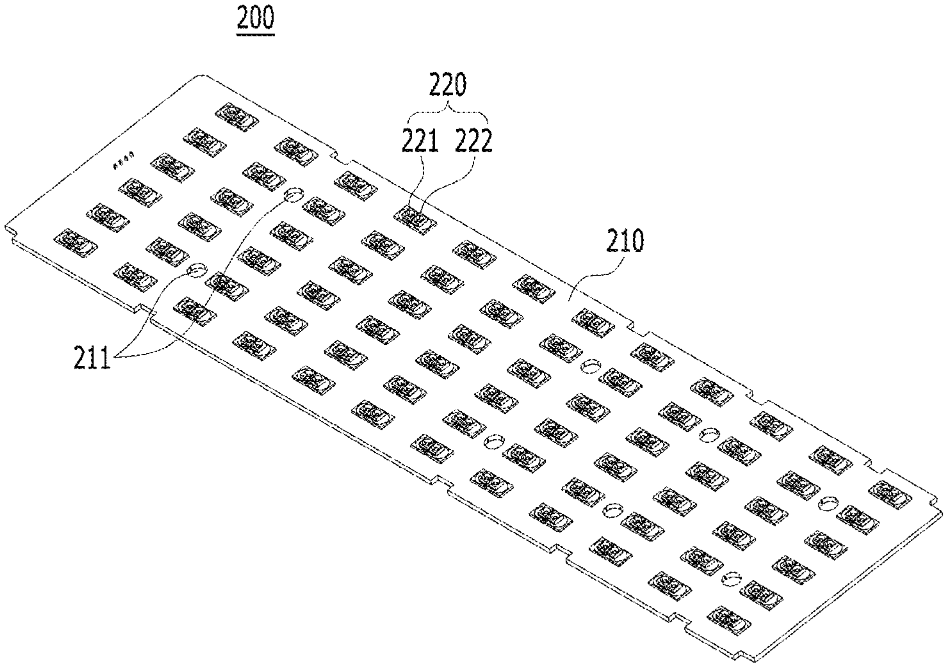

[FIG. 13]
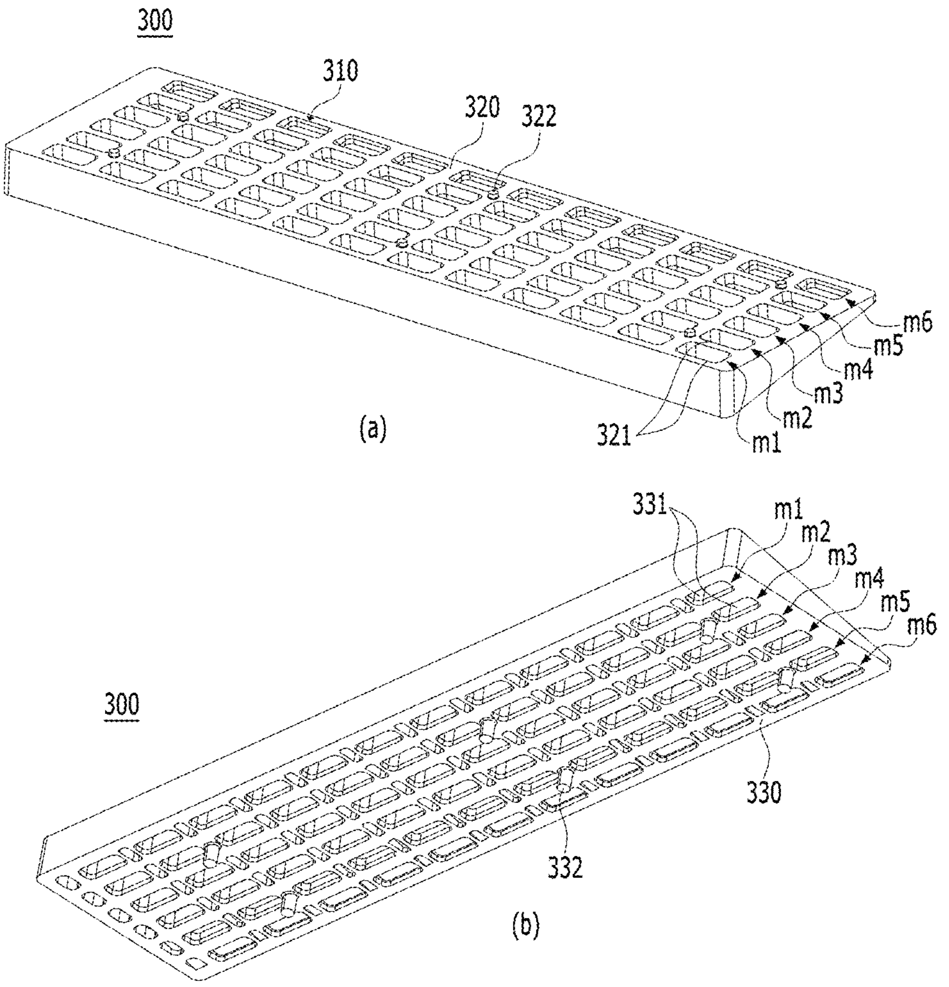

[FIG. 14]
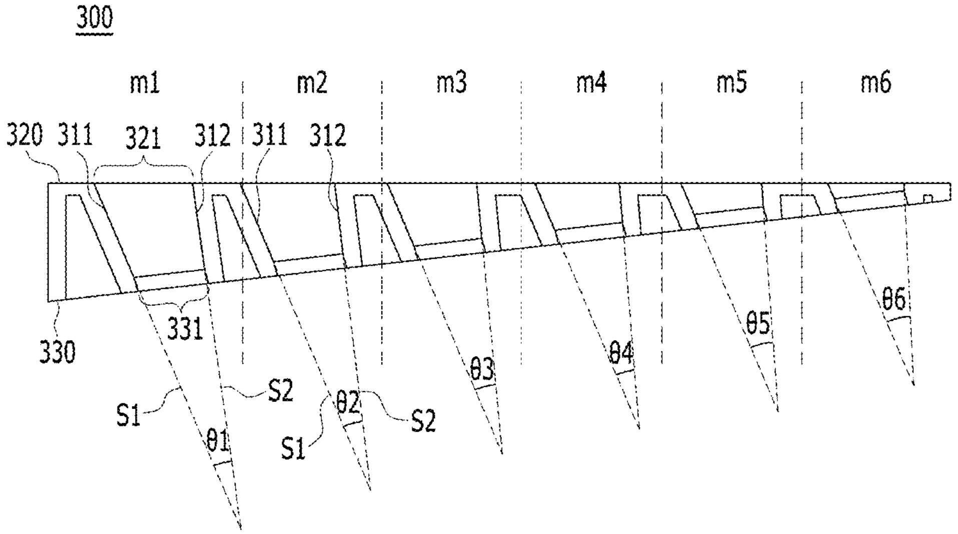
[FIG. 15]
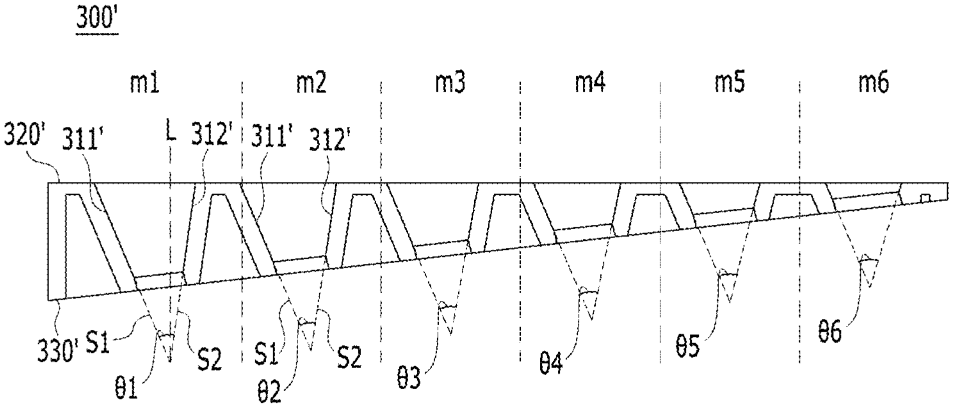

[FIG. 16]
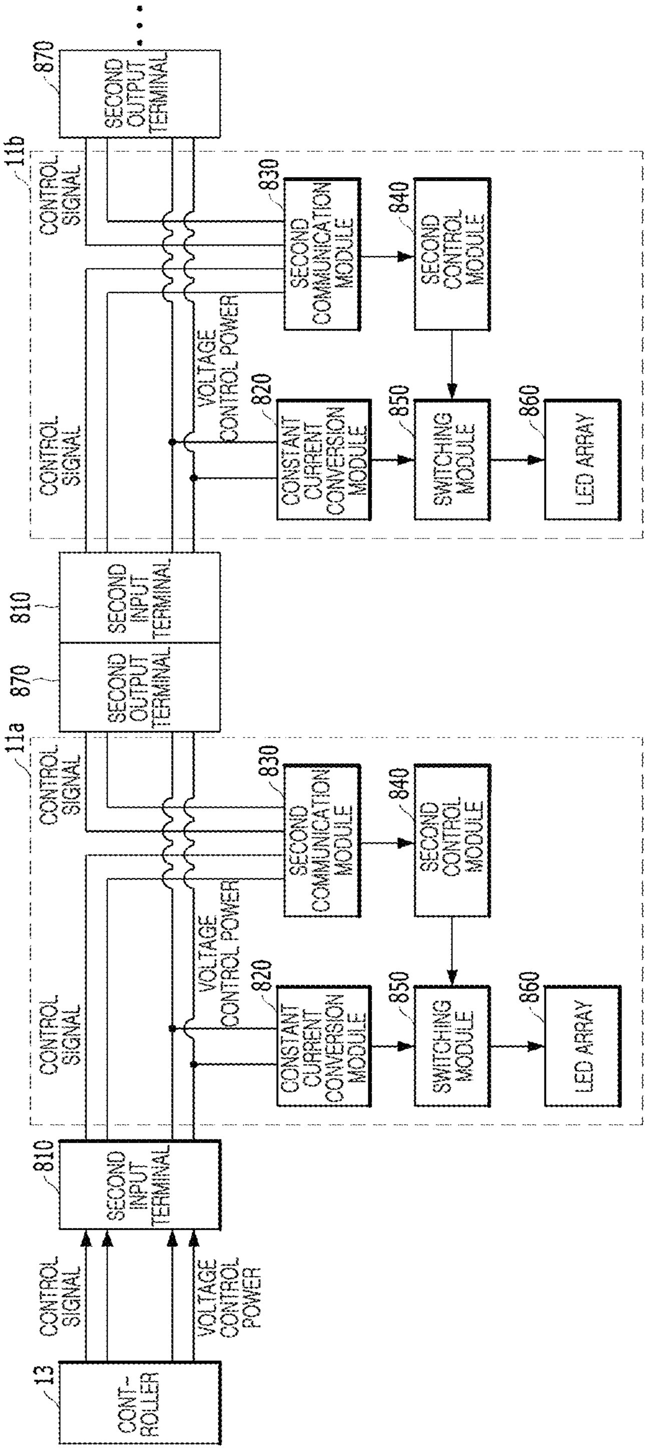

[FIG. 17]
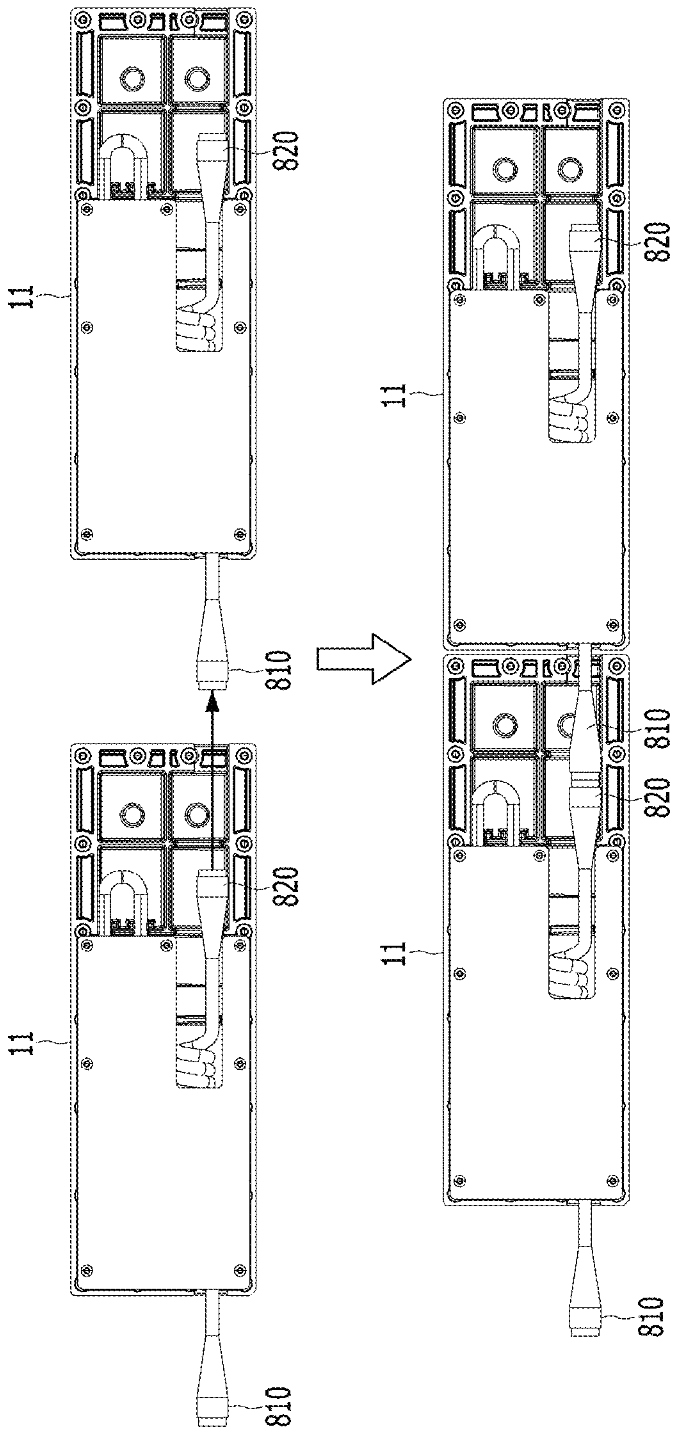

SYSTEM FOR CONTROLLING FLOOR-TYPE PEDESTRIAN SIGNALS

TECHNICAL FIELD

The present disclosure relates to a system for controlling a floor-type pedestrian signal, and more specifically, to a system for controlling a floor-type pedestrian signal, which controls lighting and flashing of a floor-type pedestrian signal with improved visibility with respect to a pedestrian.

BACKGROUND ART

A floor-type pedestrian signal is buried in the ground such as a road and emits signaling light through an upper surface thereof. The floor-type pedestrian signal is highly evaluated for effectiveness because it may be positioned in a gaze direction while providing a function of a stop line or a guide line to pedestrians. In particular, there is an advantage in that it is possible to easily provide signal information to pedestrians in line with the recent increase in the number of pedestrians walking while looking at their smartphones.

However, unlike traffic lights installed on pillars, the floor-type pedestrian signal is buried in the ground, such as a concrete or an asphalt, and the upper surface thereof should constantly withstand loads and impacts from pedestrians, motorcycles, and in some cases, vehicles and the like and may be submerged in snow or rainwater in precipitation or snowfall situations. As described above, the floor-type pedestrian signal has a poor installation environment and should be operated stably for a long time.

In addition, the floor-type pedestrian signal should maximize a pedestrian's visibility while minimizing a driver's driving interference. The floor-type pedestrian signal installed at the border between a road (crosswalk) and a sidewalk usually displays three signals: red, green, and green flashing, and it is preferable to minimize these signals because they may cause visual obstruction or confusion for vehicle drivers.

However, since the conventional floor-type pedestrian signal is provided as a plurality of floor-type pedestrian signals connected in series and receives a constant current driving power and thus gets darker toward an end thereof, there is a problem in that visibility is degraded.

SUMMARY OF INVENTION

Technical Problem

The present disclosure has been proposed to solve the problems and is directed to providing a system for controlling a floor-type pedestrian signal, which applies a control signal and voltage control power to a plurality of floor-type pedestrian signals, converts the voltage control power into constant current power by each floor-type pedestrian signal, and applies the constant current power to an LED array according to the control signal.

Solution to Problem

In order to achieve the object, a system for controlling a floor-type pedestrian signal according to an embodiment of the present disclosure includes a plurality of floor-type pedestrian signals including a light emitting diode (LED) array including LED devices of a first color and a second color and built-in in the ground between a road and a sidewalk, wherein the floor-type pedestrian signal includes an input terminal connected to one of a controller and a previous floor-type pedestrian signal and configured to receive control signals and voltage control power, an output terminal connected to a next floor-type pedestrian signal and configured to output the control signals and the voltage control power to the next floor-type pedestrian signal, a constant current conversion module configured to convert the voltage control power input to the input terminal into constant current power and output the constant current power, a communication module configured to receive and output the control signals input to the input terminal and transmit the control signals to the output terminal, a control module configured to output a switching signal based on the control signals output from the communication module, and a switching module configured to apply the constant current power to the LED array and perform switching so that the constant current power is applied to the LED device corresponding to one of the first color and the second color based on the switching signal.

The input terminal and the output terminal may include signal lines through which the control signals are transmitted, and the signal line of the input terminal and the signal line of the output terminal may be connected to the communication module. In this case, the signal line of the input terminal may be connected to an input end of the communication module, and the signal line of the output terminal may be connected to an output end of the communication module.

The input terminal and the output terminal may include a power line through which the voltage control power is applied, and the power line of the input terminal and the power line of the output terminal may be connected. In this case, the power line of one of the input terminal and the output terminal may be branched to the constant current conversion module and formed so that the voltage control power is applied to the constant current conversion module therethrough.

The input terminal may be formed as a first adapter provided on an end portion of one side of a cable formed to have a stretchable length, and the output terminal may be formed as a second adapter provided on an end portion of the other side of the cable. In this case, the input terminal may be drawn out to the outside of the floor-type pedestrian signal, and the output terminal may be disposed in an internal space of a body unit of the floor-type pedestrian signal. Here, the output terminal may stretch or contract to be connected to an input terminal of the next floor-type pedestrian signal, and the output terminal and the input terminal of the next floor-type pedestrian signal may be disposed in the internal space of the body unit in a connected state.

Advantageous Effects of Invention

According to the present disclosure, according to the system for controlling the floor-type pedestrian signal, by applying a control signal and voltage control power to a plurality of floor-type pedestrian signals, converting the voltage control power into constant current power by each floor-type pedestrian signal, and applying the constant current power to an LED array according to the control signal, it is possible to solve the problem that brightness is degraded as a distance from a controller increases in the conventional system for controlling the floor-type pedestrian signal.

In addition, according to the system for controlling the floor-type pedestrian signal, by converting the voltage control power into the constant current power by the floor-type pedestrian signal and applying the constant current power to the LED array according to the control signal, it is possible to make the lighting times of the plurality of floor-type pedestrian signals constant.

In addition, according to the system for controlling the floor-type pedestrian signal, by preventing the degradation in brightness and the lighting delay of the floor-type pedestrian signal, it is possible to constantly maintain the visibility of the floor-type pedestrian signal even when the width of the crosswalk is increased.

BRIEF DESCRIPTION OF DRAWINGS

FIG. 1 is a view for describing a floor-type pedestrian signal.

FIGS. 2 and 3 are views for describing a conventional system for controlling a floor-type pedestrian signal.

FIGS. 4 and 5 are views for describing a system for controlling a floor-type pedestrian signal according to an embodiment of the present disclosure.

FIG. 6 is a view for describing a controller of the system for controlling the floor-type pedestrian signal according to the embodiment of the present disclosure.

FIG. 7 is a perspective view illustrating the floor-type pedestrian signal according to the embodiment of the present disclosure.

FIG. 8 is a perspective view illustrating a plan side of the floor-type pedestrian signal according to the embodiment of the present disclosure.

FIG. 9 is a perspective view illustrating a lower surface side of the floor-type pedestrian signal according to the embodiment of the present disclosure.

FIG. 10 is an exploded perspective view illustrating a portion of a driving module in a body unit in FIG. 8.

FIG. 11 is an exploded perspective view illustrating a portion of a bottom surface in the body unit in FIG. 8.

FIG. 12 is an enlarged perspective view illustrating a portion of a light emitting diode (LED) module in FIG. 8.

FIG. 13 is a perspective view illustrating a plan side and a bottom surface side of a reflector in the floor-type pedestrian signal according to the embodiment of the present disclosure.

FIG. 14 is an enlarged cross-sectional view illustrating the reflector in FIG. 7.

FIG. 15 is a cross-sectional view illustrating a modified example in which a reflective surface in FIG. 14 is different.

FIG. 16 is a view for describing a configuration of the floor-type pedestrian signal according to the embodiment of the present disclosure.

FIG. 17 is a view for describing a structure in which the floor-type pedestrian signal according to the embodiment of the present disclosure is connected to another adjacent floor-type pedestrian signal.

DESCRIPTION OF EMBODIMENTS

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIG. 1, a floor-type pedestrian signal 11 applied to a system 10 for controlling the floor-type pedestrian signal according to an embodiment of the present disclosure may be installed by being buried in the ground at one side of a sidewalk curb 40 installed between a road 20 and a sidewalk 30. In this case, a plurality of floor-type pedestrian signals 11 are connected to other adjacent floor-type pedestrian signals 11 through cables.

The plurality of floor-type pedestrian signals 11 may be electrically connected to a signal controller 12 positioned outside roads or the like and interworked to a crosswalk traffic light (not illustrated).

For example, when a red lamp of the crosswalk traffic light is turned on under the control of the signal controller 12, a red light emitting diode (LED) device in the floor-type pedestrian signal 11 may be turned on together to emit red light. In addition, when a switching module of the crosswalk traffic light is turned on under the control of the signal controller 12, a green LED device in the floor-type pedestrian signal 11 may be turned on together to emit green light. At this time, when the switching module of the crosswalk traffic light blinks under the control of the signal controller 12, the green LED device in the floor-type pedestrian signal 11 may blink together. As described above, the floor-type pedestrian signal 11 installed by being buried in the ground may be displayed in red, green, and green blinking by the signal controller 12 so that a pedestrian who walks while looking at a mobile phone with his/her head down may recognize a surrounding situation.

Referring to FIGS. 2 and 3, the plurality of floor-type pedestrian signals 11 installed on a crosswalk are connected in a left-right directions using cables C.

A first floor-type pedestrian signal 11*a* is connected to the controller 13, a second floor-type pedestrian signal 11*b* is connected to the first floor-type pedestrian signal 11*a*, and a third floor-type pedestrian signal is connected to the second floor-type pedestrian signal 11*b*. Although not illustrated in FIG. 2, an $n^{th}$ floor-type pedestrian signal 11*n* is connected to an $(n-1)^{th}$ floor-type pedestrian signal 11.

In a conventional system for controlling a floor-type pedestrian signal, the signal controller 12 transmits control signals ON, OFF, and Blink to the controller 13, and the controller 13 supplies constant current power to the floor-type pedestrian signal 11 according to the control signals.

In other words, the controller 13 applies first constant current power to the first floor-type pedestrian signal 11*a* in response to the transmission of the control signals of the signal controller 12. The first floor-type pedestrian signal 11*a* applies the first constant current power to a light emitting diode (LED) array and then applies second constant current power, which is the remaining constant current power, to the second floor-type pedestrian signal 11*b*. The second floor-type pedestrian signal 11*b* applies the second constant current power to the LED array and then applies third constant current power, which is the remaining constant current power, to the third floor-type pedestrian signal 11*c*. $n^{th}$ constant current power, which is the remaining constant current power after being applied to the LED array from the first to $(n-1)^{th}$ floor-type pedestrian signals 11, is applied to the $n^{th}$ floor-type pedestrian signal 11*n* positioned at a last stage.

Since the conventional system for controlling the floor-type pedestrian signal applies the constant current power to the floor-type pedestrian signal 11 in response to the control signals, turns on the LED array with the constant current power by the floor-type pedestrian signal 11, and then turns on the remaining constant current power to the next floor-type pedestrian signal 11, there is a problem in that a brightness is degraded as the floor-type pedestrian signal 11 moves away from the controller 13.

In addition, since the conventional system for controlling the floor-type pedestrian signal uses a method of turning on the plurality of floor-type pedestrian signals 11 by applying the constant current power without applying the control signals to the floor-type pedestrian signal 11, there is a problem in that lighting times of the floor-type pedestrian signals 11 are different.

These problems are not greatly highlighted in crosswalks with a general width, but in crosswalks installed on roads with eight lanes or more, as the width of the crosswalk increases, the number of floor-type pedestrian signals 11 to be installed increases, and thus a problem of a degradation in brightness and lighting delay is highlighted.

Therefore, referring to FIGS. 4 and 5, the system 10 for controlling the floor-type pedestrian signal according to the embodiment of the present disclosure applies voltage control power and control signals ON, OFF, and Blink to the floor-type pedestrian signal 11. Here, there is provided an example in which voltage control power is power which has a specific voltage and of which current may vary.

The first floor-type pedestrian signal 11*a* is connected to the controller 13 through a cable, the second floor-type pedestrian signal 11*b* is connected to the first floor-type pedestrian signal 11*a* through the cable, and the third floor-type pedestrian signal 11*c* is connected to the second floor-type pedestrian signal 11*b* through the cable. Although not illustrated in FIG. 4, the $n^{th}$ floor-type pedestrian signal 11*n* is connected to the $(n-1)^{th}$ floor-type pedestrian signal 11 (not illustrated).

In the system 10 for controlling the floor-type pedestrian signal according to the embodiment of the present disclosure, the signal controller 12 (i.e., a connecting board 12*a* installed in the signal controller 12) transmits the control signals ON, OFF, and Blink to the controller 13, and the control signals and the voltage control power output from the controller 13 are applied to the plurality of floor-type pedestrian signals 11. Here, there is provided an example in which the ON signal is a control signal for controlling the floor-type pedestrian signal 11 to light in green, the OFF signal is a control signal for controlling the floor-type pedestrian signal 11 to light in red, and the Blink signal is a control signal for controlling the floor-type pedestrian signal 11 to blink in green.

In other words, the controller 13 outputs the voltage control power in response to the transmission of the control signals of the signal controller 12. The first floor-type pedestrian signal 11*a* to the $n^{th}$ floor-type pedestrian signal 11*n* convert the voltage control power to the constant current power. At the same time, the controller 13 outputs the control signals to the first floor-type pedestrian signal 11*a*. The first floor-type pedestrian signal 11*a* transmits the control signals to the second floor-type pedestrian signal 11*b*. The $n^{th}$ floor-type pedestrian signal 11*n* receives the control signals from the $(n-1)^{th}$ floor-type pedestrian signal 11.

The first floor-type pedestrian signal 11*a* to the $n^{th}$ floor-type pedestrian signal 11*n* perform a switching operation according to the control signals and apply the constant current power to an LED lamp corresponding to the control signal.

Therefore, the system 10 for controlling the floor-type pedestrian signal according to the embodiment of the present disclosure can solve a problem that the brightness of the floor-type pedestrian signal 11 is degraded as a distance from the controller 13 increases and a problem that lighting delay occurs between the floor-type pedestrian signals 11.

Referring to FIG. 5, the system 10 for controlling the floor-type pedestrian signal according to the embodiment of the present disclosure includes the controller 13 and the plurality of floor-type pedestrian signals 11.

The controller 13 is installed adjacent to the plurality of floor-type pedestrian signals 11. There is provided an example in which the controller 13 is installed in traffic lights installed at crosswalks. The controller 13 is connected to the signal controller 12 and the plurality of floor-type pedestrian signals 11. The controller 13 outputs the voltage control power and the control signals to the plurality of floor-type pedestrian signals 11 in response to the control signals of the signal controller 12. Here, there is provided an example in which voltage control power is power which has a specific voltage and of which current may vary.

Referring to FIG. 6, the controller 13 may include a first input terminal 710, a first control module 720, a first communication module 730, a power supply module 740, a conversion module 750, and a first output terminal 760.

The first input terminal 710 receives the control signals from the signal controller 12. The first input terminal 710 transmits the received control signals to the first control module 720.

The first control module 720 outputs a control signal transmission request and a power supply request in response to the control signals input through the first input terminal 710. At this time, the first control module 720 transmits the power supply request to the power supply module 740 and transmits the control signal transmission request to the first communication module 730.

The first communication module 730 transmits the control signals to the first output terminal 760 in response to the control signal transmission request of the first control module 720. At this time, the first communication module 730 transmits the control signals received from the signal controller 12 to the first output terminal 760 in response to the control signal transmission request of the first control module 720. Hereinafter, an example in which the first communication module 730 is formed as an RS-485 communication module will be described. Of course, the first communication module 730 may be replaced with a communication module with a communication method capable of transmitting and receiving control signals in addition to the RS-485 communication module.

The power supply module 740 outputs power in response to the power supply request from the first control module 720. At this time, the power supply module 740 is formed as a switching mode power supply (SMPS) and outputs any one of direct current power or alternating current power to the conversion module 750.

The conversion module 750 converts the power output from the power supply module 740 into the voltage control power. The conversion module 750 converts the power output from the power supply module 740 into the voltage control power that is power with a specific voltage and a variable current. The conversion module 750 applies the converted voltage control power to the first output terminal 760.

The first output terminal 760 is directly (mechanically) connected to the floor-type pedestrian signal 11. The first output terminal 760 includes two signal lines for transmitting the control signals and two power lines for applying the voltage control power. The first output terminal 760 transmits the control signals to the floor-type pedestrian signal 11 through the signal lines and applies the voltage control power to the floor-type pedestrian signal 11 through a power line.

The plurality of floor-type pedestrian signals 11 are connected by a daisy chain method for transmission and reception of the control signals. In other words, the plurality of floor-type pedestrian signals 11 is connected by the daisy chain method of receiving the control signals from the previous floor-type pedestrian signal 11 or the controller 13 and transmitting the control signals to the next floor-type pedestrian signal 11. Of course, a network structure capable of transmitting (i.e. transmitting and receiving) the control signals in addition to the daisy chain system may be applied to the plurality of floor-type pedestrian signals 11.

The plurality of floor-type pedestrian signals 11 convert the voltage control power applied from the controller 13 into the constant current power. The plurality of floor-type pedestrian signals 11 are operated in one state of green, red, and green blinking by applying the constant current power to a green LED lamp or a red LED lamp based on the control signals.

Referring to FIGS. 7 to 9, the floor-type pedestrian signal 11 according to the embodiment of the present disclosure may include a body unit 100, an LED module 200, a reflector 300, a driving module 400, and a cover unit 500.

The body unit 100 may include a base surface 110 inclined upward from one side toward the other side thereof. The inclination of the base surface 110 is to enable the LED module 200 to be installed at an inclined angle of about 10 degrees. The base surface 110 may be formed at a height at the sidewalk 30 side lower than a height at the road 20 side. By installing the LED module 200 on the base surface 110, signaling light generated from each of a plurality of LED devices 220 of the LED module 200 may be emitted at an angle inclined at about 10 degrees from verticality toward the sidewalk 30.

Therefore, pedestrians who are waiting for a signal on the ground between the road 20 and the sidewalk 30 may more easily recognize the light generated from the LED module 200. In addition, it is possible to increase the light directed to the pedestrians while minimizing the interference of the light directed to the driver of the vehicle. In other words, it is possible to further improve the pedestrians' visibility while reducing the driver's driving interference.

A plurality of holes 111 may be formed in the base surface 110 at predetermined intervals. The holes 111 of the base surface 110 may be formed to correspond to installation holes 211 of the LED module 200 and lower protrusions 332 of the reflector 300. In other words, since the lower protrusions 332 of the reflector 300 may be inserted by passing through the installation holes 211 of the LED module 200 and the holes of the base surface 110, the LED module 200 and the reflector 300 may be easily aligned at predetermined coupling positions on the base surface 110. The body unit 100 may be made of polycarbonate, but is not limited thereto.

Meanwhile, the cover unit 500 may be coupled to an upper edge 130 of the body unit 100 and formed with an accommodation space 510 that accommodates the reflector 300 and an upper portion of the body unit 100.

The cover unit 500 may include a rectangular upper plate 520 with a flat upper surface and a side wall 530 extending downward from an edge of the upper plate 520.

The upper plate 520 of the cover unit 500 may have a surface formed with a plurality of anti-slip protrusions 521. The plurality of anti-slip protrusions 521 are designed to prevent slipping and are preferably designed to have a slip resistance of 40 BPN or more.

The cover unit 500 may be made of a light-transmitting material such as polycarbonate and is preferably made of a material to maintain chemical and corrosion resistance. In addition, the cover unit 500 is preferably made of a material to withstand loads and impacts from pedestrians and motorcycles, and in some cases, vehicles and the like, and a thickness of the upper plate 520 may be about 8 mm.

Long nuts N1 may be fitted into the plurality of holes formed at intervals along an upper edge of the side wall 530 of the cover unit 500. In addition, a plurality of bolt holes 531 may be formed at intervals along a lower edge of the side wall 530 of the cover unit 500. Upper portions of the plurality of bolt holes 531 may be formed to be connected to the nuts N1, and lower portions of the plurality of bolt holes 531 may be formed to be connected to the first insertion holes 131 of the body unit 100. Therefore, a fastener, such as a bolt, fitted into the first insertion hole 131 at a lower end of the body unit 100 may be fastened to the nut N1 by passing through the bolt hole 531 of the cover unit 500, and thus the body unit 100 and the cover unit 500 may be firmly coupled. A coupling structure of the body unit 100 and the cover unit 500 will be described in detail below with reference to FIG. 11.

Meanwhile, a gasket 600 may be interposed between the upper edge 130 of the body unit 100 and a lower end of the cover unit 500 and formed in a ring shape corresponding to a perimeter of the lower end of the cover unit 500. For example, the gasket 600 may be provided in a rectangular ring shape. The gasket 600 has fastening holes 610 formed along an edge. Since the fastening hole 610 of the gasket 600 is formed to correspond to the first insertion hole 131 of the body unit 100 and the bolt hole 531 of the cover unit 500, the fastening hole 610 may be pressed as the fastener such as a bolt is fastened in the state of being interposed between the cover unit 500 and the body unit 100. The gasket 600 may perform dustproof and waterproof functions for preventing water or contaminants from entering a gap between the cover unit 500 and the body unit 100. In other words, when water, moisture, or the like is introduced from the outside, the gasket 600 may be provided to solve a problem such as a disconnection or a short circuit due to corrosion of circuit patterns formed in the LED module 200 and the driving module 400. As for the gasket 600, a rubber gasket such as EPMD or Viton may be used, but the present disclosure is not limited thereto.

A buffering sheet S may be interposed between an inner surface of the cover unit 500 and an upper surface 320 of the reflector 300 and provided to perform a buffering operation between the inner surface of the cover unit 500 and the upper surface 320 of the reflector 300. The buffering sheet S may be made of a material such as silicon, rubber, or sponge. Since a first hole H1 is formed to correspond to an open upper end portion 321 of the reflector 300, the buffering sheet S does not cover the open upper end portion 321 even when disposed on the upper surface 320 of the reflector 300. In addition, since the buffering sheet S has a second hole H2 formed to correspond to the upper protrusion 322 of the reflector 300, the second hole H2 may be fitted into the upper protrusion 322 of the reflector 300 and thus easily disposed at a predetermined position.

Referring to FIG. 10, the body unit 100 may be formed with an installation groove 120 for installing the driving module 400. The installation groove 120 may be provided as a space between a protective housing 180 and the base surface 110 to which the cable C is connected.

The driving module 400 may be provided to control the driving of the LED module 200, and a plurality of fixing grooves 410 may be formed at intervals at an edge thereof. In addition, the body unit 100 may have a fixing hole **121*a* formed in each of the plurality of installation surfaces 121 provided in the installation groove 120, and the fixing hole 121*a* may be formed to correspond to the fixing groove 410 of the driving module 400. Therefore, the driving module 400 may be detachably coupled to the installation surface 121 of the body unit 100 by a fastener (not illustrated), such as a bolt, passing through the fixing groove 410 and the fixing hole 121*a***.

Referring to FIG. 11, the body unit 100 may have a plurality of coupling holes 142 formed at intervals along a perimeter of a lower edge 140. The coupling hole 142 is formed to be coupled to a bottom surface 150, and the bottom surface 150 may be formed with through holes 151 corresponding to the coupling holes 142 of the body unit 100. Therefore, the bottom surface 150 may be detachably coupled to the lower edge 140 of the body unit 100 by a fastener (not illustrated), such as a bolt, passing through the through hole 151 and the coupling hole 142.

As described above, the bottom surface 150 disposed at a bottom of the body unit 100 may cover only a portion of an internal space 160 of the body unit 100 so that the heat transferred from the LED module 200 may be easily dissipated. In other words, the heat generated when the LED device 220 of the LED module 200 emits light is transferred to a printed circuit board (PCB) 210 of the LED module 200, and heat of the PCB 210 may be dissipated into the ground through the base surface 110 and the open internal space 160 of the body unit 100.

The bottom surface 150 may be made of synthetic resin or a steel use stainless (SUS) material that does not corrode in moisture to transfer a cold temperature of the ground to the internal space 160 through the bottom surface 150.

The internal space 160 may be formed between the bottom surface 150 and the base surface 110 disposed at the bottom of the body unit 100. The internal space 160 may be equipped with the cable C for supplying power and transmitting the control signals to the LED module 200.

The body unit 100 may have a first connection hole h1 and a second connection hole h2 formed in both end portions in a longitudinal direction, and the first and second connection holes h1 and h2 may be formed to be connected to the internal space 160. In addition, the cable C may have one end portion provided with a first adapter CA1 and the other end portion provided with a second adapter CA2, and a length between the first adapter CA1 and the second adapter CA2 may be provided to stretch and contract. Here, the first adapter CA1 may be provided in a state of being drawn out outward through the first connection hole h1, and the second adapter CA2 may be disposed in the internal space 160 of the body unit 100.

Since one floor-type pedestrian signal 11 is about 30 cm in length, the plurality of floor-type pedestrian signals 11 may be installed in a row in the longitudinal direction when installed in the ground. In this case, the cable C may be used to supply power and transmit the control signals between neighboring pedestrian signals.

Although not specifically illustrated, when one pedestrian signal is connected to another neighboring pedestrian signal, the first adapter CA1 provided on the cable C of the pedestrian signal may be inserted into the internal space 160 of the body unit 100 through the second connection hole h2 of another pedestrian signal and connected to the second adapter CA2 provided on the cable C of another pedestrian signal.

The first adapter CA1 and the second adapter CA2 may each include a pair of first terminals t1 and a pair of second terminals t2. Here, the pair of first terminals t1 may provide power (e.g., a constant voltage of DC 24 V) to the driving module 400, and the pair of second terminals t2 may be formed as an interface for RS-485 communication to transmit traffic light control signals between the driving module 400 and the signal controller 12 (see FIG. 1) on the ground. Here, the traffic light control signals include red ON/OFF, green ON/OFF, and green blinking signals. The driving module 400 may control the driving of each LED device 220 based on the traffic light control signals.

Meanwhile, a pair of cable glands 170 may be provided at both sides of the protective housing 180 disposed in the internal space 160 of the body unit 100. The cable gland 170 may be provided to connect the cable C to the protective housing 180, made of a stainless steel material, and provided with packing or sealing to have a waterproof function. The cable C may be connected to the driving module 400 through the protective housing 180.

Referring to FIG. 12, the LED module 200 may have the plurality of LED devices 220 for generating signaling light disposed on one surface of the PCB 210 in a matrix. In the embodiment of the present disclosure, an example in which the LED device 220 is provided as a pair of the red LED device 221 and the green LED device 222, and the pair of LED devices 221 and 222 are disposed in a matrix of 12 rows and 6 columns (72 in total) at equal intervals is described, but the present disclosure is not limited thereto. As an example, the LED device 220 may be provided so that a single device selectively emits red and green light. In addition, the power consumption of the LED device 220 may be in a range of 4.5 to 5 W.

Conventionally, the diode rounded LED device 220 is mainly used, but since the LED device 220 according to the embodiment of the present disclosure is provided in a chip type, a directivity angle is relatively wider than that of the conventional device. Therefore, the floor-type pedestrian signal 11 according to the embodiment of the present disclosure may adjust an angle of light using the reflector 300 and increase luminance by focusing the light. Since the light generated from the surface of the LED device 220 is reflected by the reflective surface 310 of the reflector 300, when viewed from the pedestrian's vision, not only the LED device 220 but also the reflective surface 310 are viewed like a light source, and thus a light-emitting area may be significantly expanded. The reflector 300 may be made of a polycarbonate material, but is not limited thereto.

Referring to FIG. 13, the plurality of reflective surfaces 310 of the reflector 300 may be disposed in a matrix of 12 rows and 6 columns corresponding to the plurality of LED devices 220 disposed in a matrix of 12 rows and 6 columns.

Here, the plurality of reflective surfaces 310 are classified in a unit of column and separately defined as first to $n^{th}$ column reflective surface groups (n is a natural number) sequentially from a position close to one side to a position far from the one side. In the embodiment of the present disclosure, the plurality of reflective surfaces are separately defined as first to sixth rows reflective surface groups m1, m2, m3, m4, m5, and m6 in correspondence to the plurality of LED devices 220 disposed in 12 rows and 6 columns. In this case, each of the first to sixth column reflective surface groups m1, m2, m3, m4, m5, and m6 is formed to include 12 reflective surfaces 310 disposed adjacent to each other in a row direction, that is, the longitudinal direction of the reflector 300. Specifically, the first column reflective surface group m1 has a total of 12 reflective surfaces 310 disposed in a first column, which is the closest position to one side, and the sixth column reflective surface group m6 has a total of 12 reflective surfaces 310 disposed in a 6th column, which is the farthest position from the one side. In addition, the second to fifth column reflective surface groups m2, m3, m4, and m5 mean a total of 12 reflective surfaces 310 disposed in each column.

Referring to FIG. 14, each of the first to sixth column reflective surface groups m1, m2, m3, m4, m5, and m6 may include a first wall surface 311 and a second wall surface 312 disposed at intervals in a width direction of the reflector 300. Here, a first virtual line S1 extending downward from the first wall surface 311 and a second virtual line S2 extending downward from the second wall surface 312 form a virtual angle θ at an intersection point.

For example, the first and second virtual lines S1 and S2 of the first column reflective surface group m1 form a first virtual angle θ1 at the intersection point, the first and second virtual lines S1 and S2 of the second column reflective surface group m2 form a second virtual angle θ2, and the first and second virtual lines S1 and S2 of each of the remaining third to sixth column reflective surface groups m3, m4, m5, and m6 form third to sixth virtual angles θ3, θ4, θ5, and θ6 at their intersection points.

In this case, at least two of the first to sixth column reflective surface groups m1, m2, m3, m4, m5, and m6 may have different virtual angles, and as the column reflective surface group is closer to one side, the virtual angle may be formed to be smaller. Preferably, the first to sixth virtual angles θ1, θ2, θ3, θ4, θ5, and θ6 of the first to sixth column reflective surface groups m1, m2, m3, m4, m5, and m6 may be formed differently, and as the column reflective surface group is closer to one side, the virtual angle may be formed to be smaller.

The lower surface 330 of the reflector 300 is formed as an inclined surface corresponding to the inclined base surface 110 of the body unit 100, and the upper surface 320 of the reflector 300 is disposed horizontally. Therefore, lengths of the first and second wall surfaces 311 and 312 of the second column reflective surface group m2 are formed shorter those of the first column reflective surface group m1, and the lengths of the first and second wall surfaces 311 and 312 gradually become shorter toward the sixth reflective surface group m6. In other words, a distance between the upper surface 320 of the reflector 300, which is a light-emitting surface, and the lower surface 330 of the reflector 300, which is in contact with the LED module 200, gradually becomes shorter from the first column reflective surface group m1 toward the sixth column reflective surface group m6.

Among the first to sixth column reflective surface groups m1, m2, m3, m4, m5, and m6, the sixth column reflective surface group m6 appears brightest because the distance between the light-emitting surface and the LED device 220 is the shortest, and the first column reflective surface group m1 appears relatively less bright because the distance between the light-emitting surface and the LED device 220 is longer than the sixth column reflective surface group m6.

Therefore, the floor-type pedestrian signal 11 according to the embodiment of the present disclosure may be formed so that the first to sixth virtual angles θ1, θ2, θ3, θ4, θ5, and θ6 of the first to sixth column reflective surface groups m1, m2, m3, m4, m5, and m6 may be formed to have the relationship "θ1<θ2<θ3<θ4<θ5<θ6." In other words, since the first virtual angle θ1 of the first column reflective surface group m1 is formed to be smaller than the sixth virtual angle θ6 of the sixth column reflective surface group m6, light may be emitted in a denser state even when the distance between the light-emitting surface and the LED device 220 is formed longer.

The open upper end portions 321 of the first to sixth column reflective surface groups m1, m2, m3, m4, m5, and m6 may be all formed to have the same area, and the open lower end portions 331 of the first to sixth column reflective surface groups m1, m2, m3, m4, m5, and m6 may be all formed to have the same area.

In addition, the open upper end portions 321 of the first to sixth column reflective surface groups m1, m2, m3, m4, m5, and m6 may be all formed to have the same width, and the open lower end portions 331 of the first to sixth column reflective surface groups m1, m2, m3, m4, m5, and m6 may be all formed to have the same width.

In the floor-type pedestrian signal 11, there is a problem in that since the LED module 200 is installed on the inclined base surface 110 and disposed to be tilted at a standardized angle, the distance between the light-emitting surface and the LED device 220 is different, and thus the luminance is uneven.

In order to solve this, when the open upper end portions 321 of the first to sixth column reflective surface groups m1, m2, m3, m4, m5, and m6 are all formed to have the same areas or widths and the open lower end portions 331 of the first to sixth column reflective surface groups m1, m2, m3, m4, m5, and m6 are all formed to have the same areas or widths, as the lengths of the first wall surface 311 and the second wall surface 312 are increased, the virtual angles may be smaller. In other words, since the lengths of the first wall surface 311 and the second wall surface 312 are further increased from the sixth column reflective surface group m6 close to the road 20 toward the first column reflective surface group m1 relatively closer to the sidewalk 30, the virtual angles may be smaller. In other words, since the virtual angles are formed to gradually become smaller to have the relationship of "θ1<θ2<θ3<θ4<θ5<θ6" from the sixth column reflective surface group m6 toward the first column reflective surface group m1, the light may be emitted in a denser state toward the first column reflective surface group m1. As described above, even when the distance between the light-emitting surface and the LED device 220, that is, an optical path, is relatively longer, the luminance is not reduced, and thus it is possible to improve the luminance uniformity on the light-emitting surface.

In addition, the open upper end portions 321 of the first to sixth column reflective surface groups m1, m2, m3, m4, m5, and m6 may be all formed to have greater areas than the open lower end portions 331 of the first to sixth column reflective surface groups m1, m2, m3, m4, m5, and m6. In addition, the open upper end portions 321 of the first to sixth column reflective surface groups m1, m2, m3, m4, m5, and m6 may be formed to have greater widths than the open lower end portions 331 of the first to sixth column reflective surface groups m1, m2, m3, m4, m5, and m6.

Referring to FIG. 15, a first wall surface 311' and a second wall surface 312' of each of the first to sixth column reflective surface groups m1, m2, m3, m4, m5, and m6 may be formed to be inclined in a direction that moves away from the upper portion with respect to a vertical line L passing through the open upper and lower portion.

A reflector 300' is manufactured by injection-molding, and when the first wall surface 311' and the second wall surface 312' are formed to be inclined in a direction closer upward with respect to the vertical line L, it is difficult to easily remove a molded component (not illustrated) from the upper side when the molded component inserted to form the first and second wall surfaces 311' and 312' tries to be removed after the reflector 300' is molded. On the other hand, when the first wall surface 311' and the second wall surface 312' are formed to be inclined in a direction that moves away upward with respect to the vertical line L, the molded component may be easily removed from the upper side.

According to the floor-type pedestrian signal 11 according to the embodiment of the present disclosure, it is possible to improve the luminance uniformity on the light-emitting surface because the luminance is not reduced even when the distance between the light-emitting surface and the LED device, that is, the optical path is relatively longer.

In addition, according to the floor-type pedestrian signal 11 according to the embodiment of the present disclosure, when repair or replacement is required in a state in which the floor-type pedestrian signal is installed by being buried in the ground, it is possible to easily repair or replace the reflector, the LED module, and the like by releasing the bolt or the like and separating the cover unit, thereby facilitating maintenance.

Referring to FIGS. 16 and 17, the floor-type pedestrian signal 11 includes a second input terminal 810, a constant current conversion module 820, a second communication module 830, a second control module 840, a switching module 850, an LED array 860, and a second output terminal 870.

Here, the constant current conversion module 820, the second communication module 830, the second control module 840, and the switching module 850 may be formed of a printed circuit board on which chips and circuits are mounted/formed and built-in the above-described body unit. In addition, the LED array 860 corresponds to the LED module 200, and the second input terminal 810 and the second output terminal 870 correspond to the first adapter CA1 and the second adapter CA2 connected to the cable C, respectively.

In addition, the term "previous floor-type pedestrian signal 11" used to describe the embodiment of the present disclosure below is the floor-type pedestrian signal 11 adjacent to the floor-type pedestrian signal 11, which is the subject of description, and disposed closer to the controller 13 than the floor-type pedestrian signal 11 is.

In addition, the term "next floor-type pedestrian signal 11" used to describe the embodiment of the present disclosure below is the floor-type pedestrian signal 11 disposed adjacent to the floor-type pedestrian signal 11, which is the subject of description, and disposed further far from the controller 13 than the floor-type pedestrian signal 11 is.

The second input terminal 810 is connected to the controller 13 or the previous floor-type pedestrian signal 11. The second input terminal 810 receives the control signals from the controller 13 or the previous floor-type pedestrian signal 11 and receives the voltage control power. Here, the second input terminal 810 corresponds to the first adapter CAL The second input terminal 810 includes two signal lines for transmitting the control signals and two power lines for applying the voltage control power. At this time, a pair of signal lines is connected to an input end of the second communication module 830, and the control signals are transmitted to the second communication module 830 therethrough. A pair of power lines is connected to the power line of the second output terminal 870 to apply the voltage control power to the second output terminal 870. At this time, the pair of power lines is branched to the constant current conversion module 820, and the voltage control power is applied to the constant current conversion module 820 therethrough.

The constant current conversion module 820 is connected to branch lines branched from the pair of power lines connecting the second input terminal 810 to the second output terminal 870. The constant current conversion module 820 converts the voltage control power applied through the branch lines into constant current power. The constant current conversion module 820 applies the converted constant current power to the switching module 850.

The second communication module 830 transmits the control signals input from the second input terminal 810 to the second control module 840 and the second output terminal 870. The second communication module 830 includes an input end connected to a signal line of the second input terminal 810 and an output end connected to a signal line of the second output terminal 870. The second communication module 830 transmits the control signals received through the input end to the second control module 840. The second communication module 830 transmits the control signals received through the input end to the second output terminal 870 through the output end.

The second control module 840 controls an operation of the switching module 850 based on the control signals received from the second communication module 830. At this time, the second control module 840 outputs one of a first switching signal, a second switching signal, and a third switching signal to the switching module 850 based on the control signals. For example, the second control module 840 outputs a first switching signal when receiving an ON signal as a control signal, outputs a second switching signal when receiving an OFF signal as a control signal, and outputs a third switching signal when receiving a Blink signal as a control signal.

The switching module 850 applies the constant current power output from the constant current conversion module to the LED array 860. At this time, the switching module 850 applies the constant current power to some lamps of the LED array 860 based on the switching signal from the second control module 840.

The switching module 850 performs switching so that the constant current power is applied to a green LED device of the LED array 860 in response to the first and third switching signals of the second control module 840. The switching module 850 performs switching so that the constant current power is applied to a red LED device of the LED array 860 in response to the second switching signal from the second control module 840. At this time, the switching module 850 may repeat a switching operation of the green LED device of the LED array 860 in response to the third switching signal of the second control module 840 so that the constant current power is applied to the green LED device at constant intervals (time intervals).

The LED array 860 includes a plurality of green LED devices and a plurality of red LED devices. The LED array 860 may include a pair of green LED device and red LED device to form a lamp array and may be formed by arranging a plurality of lamp arrays in a matrix.

The second output terminal 870 is connected to the next floor-type pedestrian signal 11. The second output terminal 870 is connected to the second input terminal 810 of the next floor-type pedestrian signal 11. The second output terminal 870 outputs the control signals and the voltage control power to the next floor-type pedestrian signal 11.

The second output terminal 870 is formed as a spring-shaped cable normally built-in a lower portion of the body unit and extending when connected to the second input terminal 810 of another floor-type pedestrian signal 11. Here, the output terminal corresponds to the second adapter CA2.

The second output terminal 870 includes a pair of signal lines connected to the output end of the second communication module 830 and a pair of power lines connected to the power line of the second input terminal 810. At this time, the pair of signal lines is connected to the output end of the second communication module 830, and the control signals are transmitted to the next floor-type pedestrian signal 11 therethrough. The pair of power lines is connected to the power line of the second output terminal 870, and the voltage control power is applied to the second output terminal 870 therethrough.

Although the preferred embodiments of the present disclosure have been described above, modifications can be made in various forms, and those skilled in the art can carry out various changes and modifications without departing from the claims of the present disclosure.

The invention claimed is:

1. A system for controlling a floor-type pedestrian signal, comprising a plurality of floor-type pedestrian signals including a light emitting diode (LED) array including LED devices of a first color and a second color and built-in in the ground between a road and a sidewalk, wherein the floor-type pedestrian signal includes:

an input terminal connected to one of a controller and a previous floor-type pedestrian signal and configured to receive control signals and voltage control power;

an output terminal connected to a next floor-type pedestrian signal and configured to output the control signals and the voltage control power to the next floor-type pedestrian signal;

a constant current conversion module configured to convert the voltage control power input to the input terminal into constant current power and output the constant current power;

a communication module configured to receive and output the control signals input to the input terminal and transmit the control signals to the output terminal;

a control module configured to output a switching signal based on the control signals output from the communication module; and a switching module configured to apply the constant current power to the LED array and perform switching so that the constant current power is applied to the LED device corresponding to one of the first color and the second color based on the switching signal, and wherein the input terminal and the output terminal include signal lines through which the control signals are transmitted, and the signal line of the input terminal and the signal line of the output terminal are connected to the communication module.

2. The system of claim 1, wherein the signal line of the input terminal is connected to an input end of the communication module, and the signal line of the output terminal is connected to an output end of the communication module.

3. The system of claim 1, wherein the input terminal and the output terminal include a power line through which the voltage control power is applied, and the power line of the input terminal and the power line of the output terminal are connected.

4. The system of claim 3, wherein the power line of one of the input terminal and the output terminal is branched to the constant current conversion module and formed so that the voltage control power is applied to the constant current conversion module therethrough.

5. The system of claim 1, wherein the input terminal is formed as a first adapter provided on an end portion of one side of a cable formed to have a stretchable length, and the output terminal is formed as a second adapter provided on an end portion of the other side of the cable.

6. The system of claim 5, wherein the input terminal is drawn out to the outside of the floor-type pedestrian signal.

7. The system of claim 5, wherein the output terminal is disposed in an internal space of a body unit of the floor-type pedestrian signal.

8. The system of claim 7, wherein the output terminal stretches or contracts to be connected to an input terminal of the next floor-type pedestrian signal.

9. The system of claim 7, wherein the output terminal and the input terminal of the next floor-type pedestrian signal are disposed in the internal space of the body unit in a connected state.

* * * * *